United States Patent [19]

Appelbaum et al.

[11] Patent Number: 4,491,727
[45] Date of Patent: Jan. 1, 1985

[54] SOLAR RADIATION SENSOR AND SYSTEM INCLUDING SAME FOR MEASURING SOLAR RADIATION DISTRIBUTION

[75] Inventors: Joseph Appelbaum, Raanana; Reuven Weiss, Bat Yam, both of Israel

[73] Assignee: Ramot University Authority for Applied Research, Ramat Aviv, Israel

[21] Appl. No.: 279,348

[22] Filed: Jul. 1, 1981

[51] Int. Cl.$^3$ .............................. G01J 1/20; F24J 3/02
[52] U.S. Cl. .................................. 250/203 R; 126/425
[58] Field of Search ............... 250/203 R, 227, 578, 250/203 S, 209; 126/424, 425; 356/141, 152

[56] References Cited

U.S. PATENT DOCUMENTS

| | | | |
|---|---|---|---|
| 3,953,131 | 4/1976 | Britz | 250/227 X |
| 4,153,038 | 5/1979 | McDonald | 250/203 R X |
| 4,223,174 | 9/1980 | Moeller | 250/203 R X |
| 4,325,788 | 4/1982 | Snyder | 250/203 R X |
| 4,361,758 | 11/1982 | Rotolo | 126/425 X |

*Primary Examiner*—Edward P. Westin
*Attorney, Agent, or Firm*—Benjamin J. Barish

[57] ABSTRACT

A solar radiation sensor comprises a semispherical or spherical body member formed with a plurality of radially-extending passageways leading to individual solar-radiation sensors individually oriented and shielded so as to intercept only solar radiation progressing along the radial lines towards the detectors. In one described embodiment, the detectors are recessed within the body member at the bottom of their respective bores, and in a second described embodiment the detectors are all formed in a flat face of the body member and receive the solar radiations by means of fiber optical elements disposed within the bores.

10 Claims, 9 Drawing Figures

SOLAR RADIATION SENSOR AND SYSTEM INCLUDING SAME FOR MEASURING SOLAR RADIATION DISTRIBUTION

BACKGROUND OF THE INVENTION

The present invention relates to a solar radiation sensor, and also to a system including such a sensor for measuring solar radiation distribution. The sensor and system of the present invention may be used for determining the available solar energy radiation in a number of possible applications, as will be described more fully below.

The most commonly used instruments for determining the available solar energy radiation include: pyrheliometers for measuring the direct radiation from the solar disk; pyranometers for measuring the global (combination of direct solar radiation and diffuse radiation) from the sky; and duration-of-sunshine instruments for measuring the fraction of daylight hours the sun is not obscured by clouds. The radiation sensors used in these instruments may be either thermal detectors or photodetectors. The global radiation measurements at meteorological stations are on horizontal surfaces. The same pyranometer, with the addition of a shading ring, is also used to measure diffuse radiation on horizontal surfaces. Not all solar radiation stations have all the above instruments, and therefore some radiation quantities are not measured.

The measured diffuse radiation is an average value, and an assumption is made about the isotropy of the sky. However, partly cloudy skies (and even clear skies) deviate from isotropic conditions. The above assumption can therefore be a source of considerable error in the design of static solar systems at tilted angles.

Knowledge of the amount of solar radiation incident at any time on a solar collector is essential for the design of economically competitive collectors and for making efficient use of energy conversion systems. Unfortunately, data routinely collected at meteorological radiation stations are not sufficient for solar energy conversion uses. Meteorologists and solar radiation scientists need radiation data in their studies of the physics of the atmosphere and in long term forecasting of radiation trends. Solar applications require knowledge of insolation on tilted surfaces for flat plate collectors, and knowledge of the angular distribution of the diffuse radiation is necessary to evaluate properly the performance of concentrating systems while comparing them with non-concentrating systems. Although insulation data on various tilt and azimuth angles can be essentially accomplished with the existing instruments, such a station would be very expensive to set up.

BRIEF SUMMARY OF THE INVENTION

An object of the present invention is to provide a novel system for measuring solar radiation distribution.

According to the present invention, there is provided a system for measuring solar radiation distribution comprising: a sensor including a plurality of individual directional solar radiation detectors oriented radially around at least one-half of a spherical surface and individually shielded so as to simultaneously intercept only solar radiation progressing along radial lines with respect to that surface; a maximum radiation selector circuit which selects the peak output from all the detectors to provide a measurement of the direct solar radiation direction; and means for providing a measurement of the direct solar radiation intensity. The latter means comprises a neighbour selector circuit which selects the detectors nearest to the one having the peak output, an averager circuit which averages the outputs of the detectors selected by the neighbour selector circuit, and a subtractor circuit which subtracts the output of the averager circuit from that of the detector having the peak output.

Preferably, the means for producing a measurement of the direct solar radiation intensity further includes a second averager circuit which is effective, if more than one detector outputs a peak reading, to average the outputs from such detectors and to supply the averaged output to the subtractor circuit.

According to a more specific aspect, the sensor further includes a body member having an outer face defining said spherical surface and formed with a plurality of radially-extending, radiation-conducting passageways leading to said solar radiation detectors and shielding same against all solar radiation except that progressing along said radial lines. More particularly, the body member is of material which is substantially non-conducting with respect to solar radiation, said radiation-conducting passageways being bores extending radially through the body member from its outer face to the solar radiation detectors.

Several embodiments of the invention are described below for purposes of example. Thus, in one described embodiment the solar radiation detectors are recessed within the body member at the bottoms of their respective bores. In a second described embodiment, the body member further includes an optical fiber element in each bore for conducting the radiations intercepted thereby to their respective solar radiation detectors.

Preferably, the body member is of semispherical configuration and has a flat underface. With such a construction, the sensor may be mounted in an upright position, i.e., with its semispherical surface facing the sky and with its flat underface disposed horizontally, whereupon the detectors measure direct, global and diffuse radiation. The sensor may also be mounted in an inverted position, whereupon the detectors measure reflected radiation. Two such semispherical sensors can be used in back-to-back relationship so as to define a completely spherical sensor, whereupon both direct and reflected radiations may be measured simultaneously; alternatively, a spherical sensor may be constructed as a single spherical body.

As will be described more particularly below, systems may be made in accordance with the foregoing features of the invention to provide various types of static, multipurpose, solar radiation measuring instruments, to supply the common solar radiation data of the conventional instruments, and also additional data, as follows:

1. Direct radiation ($G_b$).
2. Global radiation on a horizontal surface ($G_h$).
3. Diffuse radiation on a horizontal surface ($G_{dh}$).
4. Global radiation on any desired tilted surface and azimuthal surface [$G(\beta,\gamma)$].
5. Diffuse radiation on any desired tilted and azimuthal surface [$G_d(\beta,\gamma)$].
6. Distribution of radiation in the sky [$G_i(\beta,\gamma)$].
7. Distribution of diffuse radiation in the sky [$G_{di}(\beta,\gamma)$].
8. Distribution of ground reflection [$R_i(\beta,\gamma)$].

9. Reflected radiation on any desired tilted surface and azimuthal surface [R($\beta,\gamma$)].
10. Total (short and long wave) radiation (with appropriate detector).
11. Cloudiness indices—ratio of diffuse-to-global and direct-to-global radiation on horizontal surfaces.
12. Cloud cover—sky cloud cover percentage.

Following are examples of possible applications of the novel solar radiation sensor:
1. Measuring solar radiation at meterological and research institution stations.
2. Measuring solar radiation for solar energy conversion systems (thermal and photovoltaic):
   a. Solar radiation data needed for solar collector installations at various tilts and azimuths;
   b. Solar radiation data needed for optimal deployment of a field of collectors;
   c. Orientating solar collectors to maximum radiation at any time during the day (tracking systems); and
   d. Providing insolation models of solar energy applications for various weather conditions and geographical locations.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
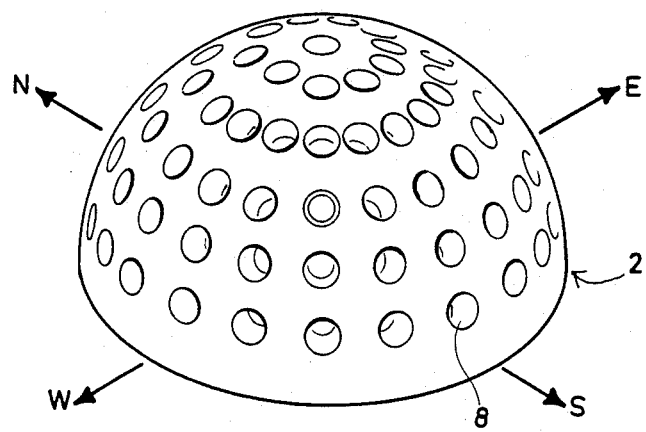
FIG. 1 is an outer view diagrammatically illustrating a semispherical sensor constructed in accordance with the present invention.

With reference to FIGS. 1–4, there is illustrated a semispherical solar radiation sensor comprising a body member 2 having an outer face 4 of semispherical configuration, and an underface 6 of flat or planar configuration. Body member 2 is of opaque insulating material which is non-conducting with respect to solar radiations. It is formed with a plurality of bores 8 extending from its outer semispherical face radially inwardly a short distance. A solar radiation detector element 10 is provided at the bottom of each bore 8 and is connected by an electrical conductor 12 to an outlet cable 14 coupling all the detectors to an electrical data-processing circuit shown schematically by block 16 in FIG. 2. The detectors all have flat faces oriented such that lines normal thereto are also normal to the semispherical outer face 4.

Figure 2:
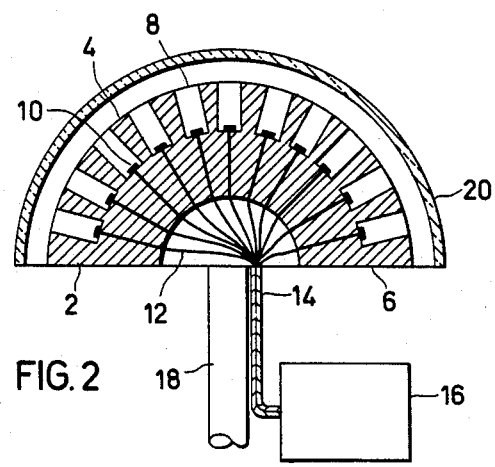
FIG. 2 is a sectional view illustrating the construction of the semispherical sensor of FIG. 1.

FIG. 2 also illustrates a mounting post 18 for mounting the sensor unit, and a semispherical, transparent cover 20 overlying but spaced from the outer face 4 of the body member 2.

It will be seen that the plurality of detectors 10 disposed at the bottoms of their bores 8 serve as individual, directional, solar radiation detectors which are individually shielded so as to simultaneously intercept only solar radiations progressing along lines extending radially of the semispherical surface 4. Thus, each bore 8 serves as a narrow aperture to give directional properties to its respective detector 10. The number of such detectors 10 is determined by the desired number of directions of radiation measurements for the particular application involved.

Figure 3:
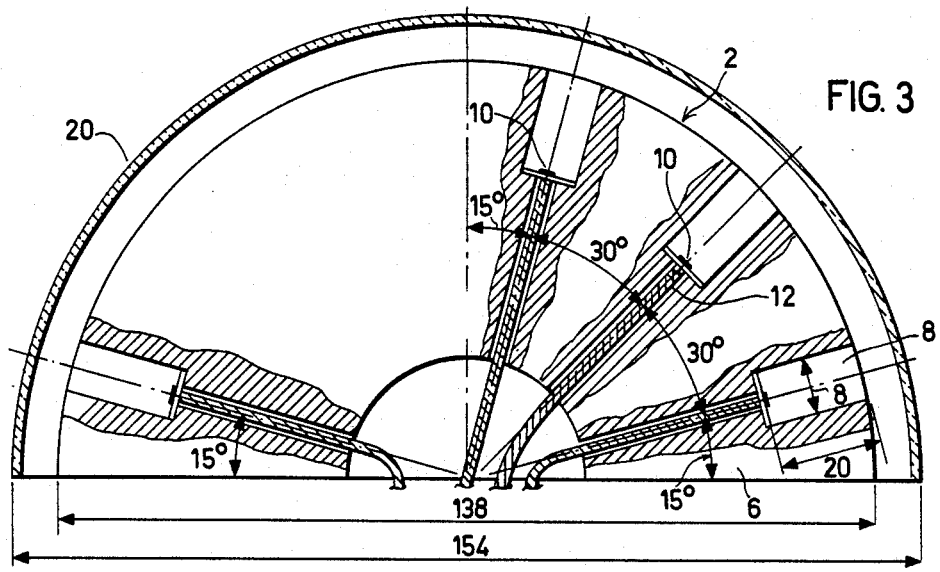
FIG. 3 is an enlarged sectional view more particularly illustrating the construction of the sensor of FIG. 2.
Figure 4:
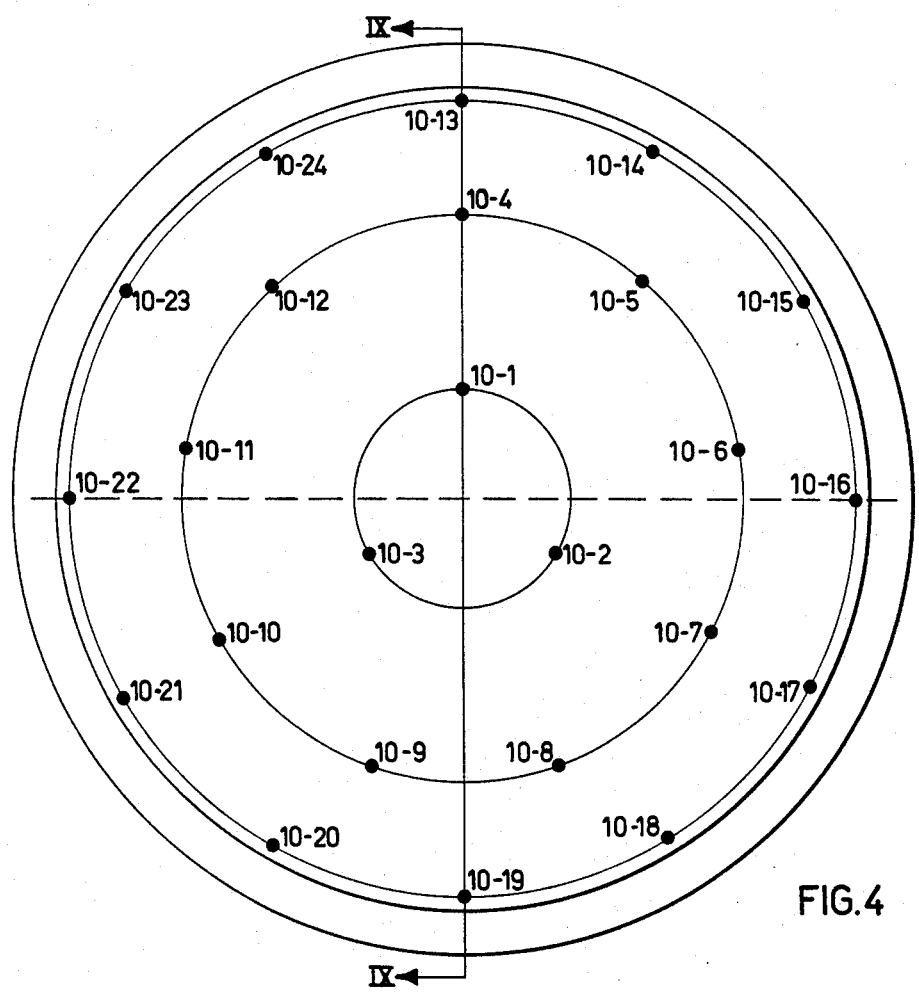
FIG. 4 is a top plan view illustrating the disposition of the detectors in the sensor of FIG. 3.

As one example, FIGS. 3 and 4 illustrate a sensor wherein the detectors 10 are disposed on three concentric circles, there being three detectors (10-1 to 10-3) in the innermost circle, nine detectors (10-4 to 10-12) in the intermediate circle, and twelve detectors (10-13 to 10-24) in the outermost circle, totalling 24 detectors in all. In the illustrated example, the axes of the detector bores are disposed at an angle of 30° to each other, those of the outermost concentric circle being at an angle of 15° to the flat planar face 6 of the semispherical body member 2; the diameter of the body member 2 is 138 mm; the diameter of the transparent cover 20 is 154 mm; the diameter of each bore 8 is 8 mm; and the length of each bore 8 is 20 mm.

Figure 5:
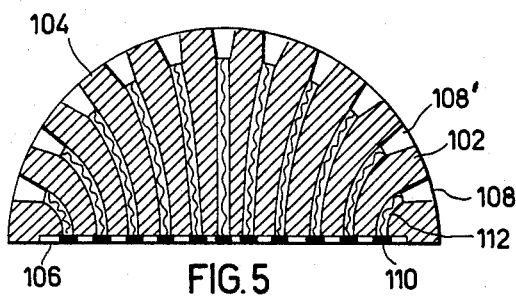
FIG. 5 illustrates another semispherical sensor similar to that of FIG. 2 but including optical fibers for conducting the solar radiations to the respective detectors.
Figure 6:
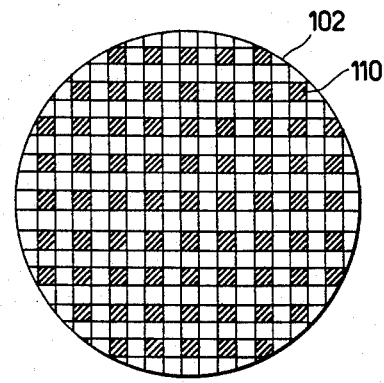
FIG. 6 is a view illustrating the planar underface of the semispherical sensor of FIG. 5, and particularly showing the disposition of the detector elements.

FIGS. 5 and 6 illustrate a variation wherein the semispherical body member, therein designated 102, is formed with bores 108 extending from the outer semispherical face 104 of the body member to its flat planar underface 106, on which planar face are located the detectors 110 disposed as a matrix. Each bore 108 further receives an optical fiber element 112 to conduct the solar radiation intercepted by the respective bore to its detector 110. Such an arrangement as illustrated in FIGS. 5 and 6, using optical fibers, can conveniently provide considerably denser packing of the directional detectors; thus, FIG. 6 illustrates a matrix including 69 detectors 110.

As shown in FIG. 3, the bores (8) may each be of cylindrical configuration, with their respective detectors (10) located at the bottom of each bore, of circular configuration. However, the bores 8 may take other configurations, as shown for example in FIG. 5, illustrating bore 108 as having a conically-shaped mouth 108'.

Figure 7:
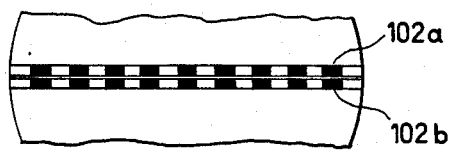
FIG. 7 illustrates the use of two semispherical sensors in back-to-back relationship to provide a spherical sensor.

It will be seen that when the semispherical sensor illustrated in FIGS. 1–4 (or 5–6) is mounted with its planar underface 6 (or 106) disposed horizontally and the semispherical face 4 (or 104) oriented upwardly, the detectors will simultaneously intercept direct, global, and diffuse radiation from the sky, and therefore can be used for mapping the solar radiation emanating from the sky. If the sensor is mounted in an inverted position, that is, with its planar face disposed upwardly, the sensor can be used for measuring reflected radiation. In addition, by providing two of these semispherical sensors in back-to-back relationship, i.e. with their planar faces, e.g. 106, in contact with each other, as illustrated in FIG. 7, by the two semispherical bodies 102a and 102b, a spherical sensor is produced capable of intercepting and measuring the solar radiations from all directions, i.e., direct, global, diffuse and reflected radiations.

Figure 8:
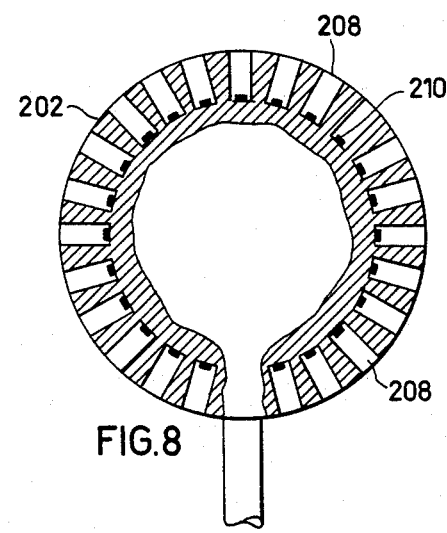
FIG. 8 illustrates another construction of a spherical sensor.

A completely spherical sensor may also be provided, as shown in FIG. 8, by constructing the body member, therein designated 202, of spherical configuration. In such an arrangement, the bores 208 would be formed through the complete outer spherical surface of the body member 202, extending radially towards its center, with each such bore provided with a radiation detector 210 at the bottom, similar to the arrangement illustrated in FIGS. 1-4.

The electrical signals generated by the detectors (e.g., 10 in FIGS. 1-4) may be processed off-line (i.e., by recording them and processing them later), or on-line (i.e., at the time the measurements are taken). The data processor for processing this information may be either digital, e.g. including a microprocessor, or analog. In an analog data processor, all the detector outputs would be measured and processed in parallel, preferably continuously. If the processing is to be done digitally, the digital data processor would include a built-in real-time clock to define sampling periods, preferably minutes, during each of which all the detectors would be rapidly scanned for obtaining the data which would be processed and recorded or displayed.

Figure 9:
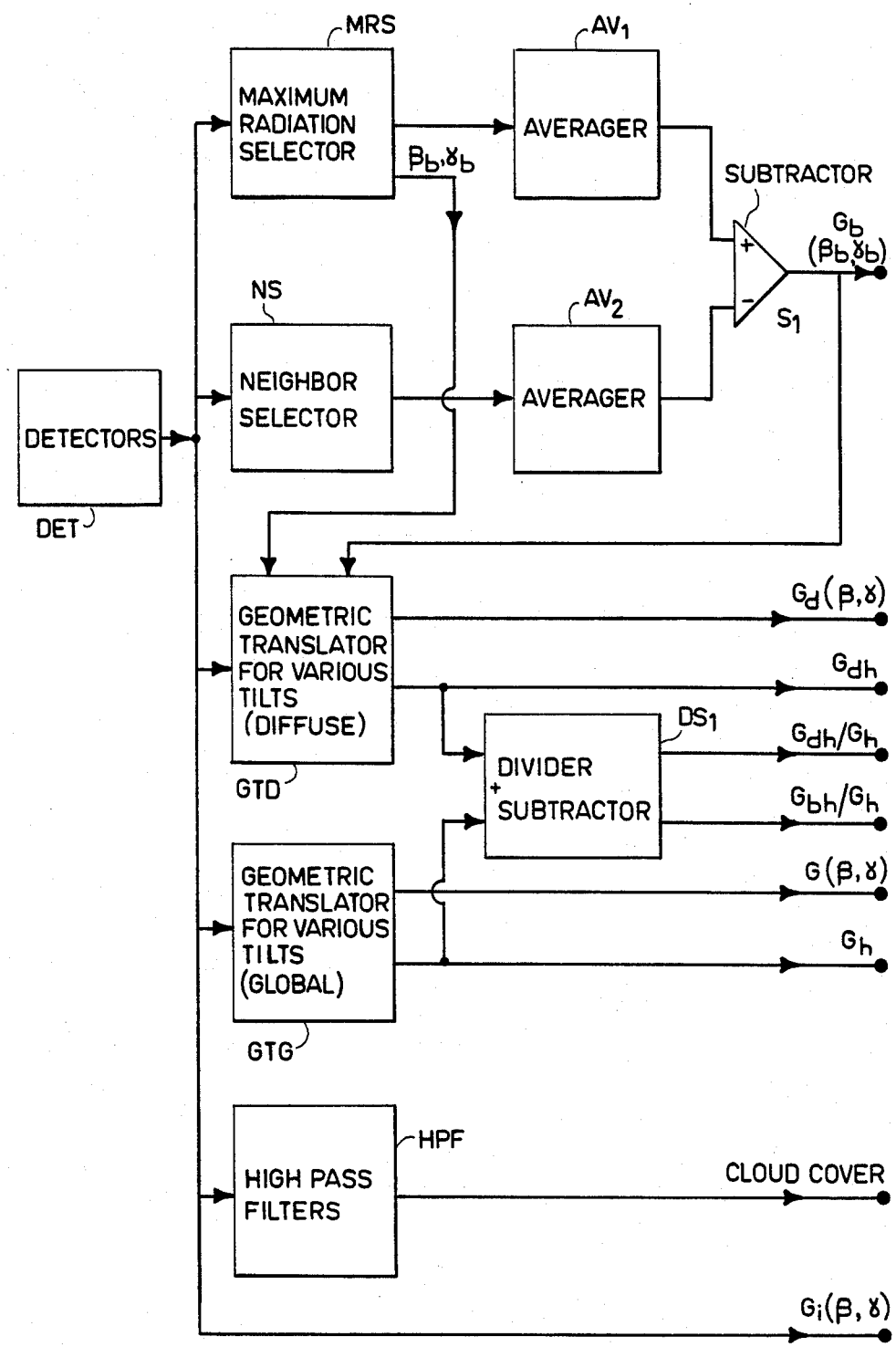
FIG. 9 is a block diagram of a system for processing the electrical signals produced by the detectors in the sensor described above and for producing various types of measurements relating to solar radiation distribution.

FIG. 9 schematically illustrates a data processor that could be used for unit 16 in FIG. 2. In the diagram of FIG. 9, each block represents an electronic circuit, or a computer sub-routine when a digital processor is used, for purposes of showing the algorithms or steps involved in producing different output data, as will be described more particularly below.

Briefly, the outputs from these detectors may be used for producing the following data in the manner set forth.

A. Beam Direction: All the detector outputs are simultaneously compared with each other, whereupon the following cases are possible regarding the beam radiation:
  (1) When there is a unique maximum reading, which is significantly greater than all other readings, the direction of this maximum measurement is assumed to be the direction of the beam radiation.
  (2) When there are two or more readings, from detectors pointing to *almost* the same direction, which are very close to each other but significantly higher than the other readings, the beam is assumed to come from the mean direction of the peak readings.
  (3) When all readings are dispersed evenly around a common value, no beam radiation is assumed.

B. Beam Radiation Intensity: The outputs of the detectors *nearest* to those which give the maximum readings are assumed to come from diffuse radiation only. The mean of this diffuse radiation is assumed to be the diffuse radiation from the beam direction. Subtracting this value from the measured maximum intensity (or intensities) gives the beam intensity.

C. Intensity of Diffuse Radiation on Horizontal and Tilted Surfaces: All measurements not from the beam direction are assumed to be values of diffuse radiation from the particular direction. The diffuse radiation from the beam direction (for a wide detector aperture) is taken into account. After suitable geometric transformation from the various directions to the desired direction, the intensity of diffuse radiation on a horizontal or a tilted surface is computed.

D. Intensity of Global Radiation on Horizontal and Tilted Surfaces: The radiation from each direction is geometrically transformed to the desired tilted surface and summed up.

E. Cloud Indices and Cloud Cover: The cloud indices are determined from the computed values of the diffuse, direct and global radiation on a horizontal surface. The time derivative of each detector output signals cloud passage in the monitoring direction.

The block diagram of FIG. 9 illustrates, in algorithm form, the steps involved in determining the above-described values from the outputs of the detectors 10 (or 110) shown collectively by the block DET. The detector outputs are proportional to the radiation incident on the surfaces of the respective detectors 10 (or 110) at a given tilt angle ($\beta$) and azimuth angle ($\gamma$).

Thus, the outputs of the detectors are supplied to a maximum radiation selector circuit MRS which selects the peak output from all the detectors, which is used for determining beam direction, as described above. If there is more than one peak output, the maximum outputs are averaged by an averager circuit $AV_1$.

The outputs of the detectors are also supplied to a neighbor selector circuit NS, which selects the readings from the detectors nearest to the one or ones having the maximum outputs. The outputs of selector circuit NS are averaged in an averager circuit $AV_2$, the result of which is assumed to be the diffuse radiation coming from the direction of the beam. This value is subtracted in a subtractor circuit $S_1$ from the averaged maximum readings from circuit MRS to produce the value $G_b$ at an angle ($\beta_b$, $\gamma_b$), corresponding to the beam radiation at the incoming tilt and azimuth angle.

The outputs from the detector are also supplied to a geometric translator circuit GTD, which computes the diffuse radiation on horizontal $G_{dh}$ and on tilted surfaces $[G_d(\beta,\gamma)]$. These values are obtained by subtracting the beam radiation $[G_b(\beta_b, \gamma_b)]$ from the global radiation in the direction of the beam ($\beta,\gamma$) and translating the detector radiations to the desired tilts and azimuths.

The outputs of detector 10 are also supplied to a second geometric translator circuit GTG, which circuit computes the global radiation on horizontal surfaces ($G_h$), and the global radiation on tilted surfaces $[G(\beta,\gamma)]$. The global radiation on horizontal surfaces ($G_h$) is subtracted from the diffuse radiation on horizontal surfaces ($G_{dh}$) in divider and subtractor circuit $DS_1$, which circuit computes the cloudiness indices, namely, diffuse-to-global radiation on a horizontal surface ($G_{dh}/G_h$), and direct-to-global radiation on a horizontal surface ($G_{bh}/G_h$).

The outputs from the detectors are also fed to high-pass filters HPF, which determine the cloud cover percentage of the sky.

It will be appreciated that when the semispherical sensor is inverted, it measures reflected radiation, so that $G(\beta,\gamma)$ becomes $R(\beta,\gamma)$ and $G_i(\beta,\gamma)$ becomes $R_i(\beta,\gamma)$.

The specific circuits that may be used for each block in FIG. 9 are available in the known prior art from the above-described functions of each circuit.

While the invention has been described with respect to several preferred embodiments, it will be appreciated that many other variations, modifications, and applications of the invention may be made.

What is claimed is:

1. A system for measuring solar radiation distribution comprising: a sensor having a plurality of individual, directional, solar radiation detectors oriented radially around at least one-half of a spherical surface and individually shielded so as to simultaneously intercept only solar radiation progressing along radial lines with respect to said surfaces; a maximum radiation selector circuit which selects the peak output from all said detectors to provide a measurement of the direct solar radiation; and means for providing a measurement of the direct solar radiation intensity, comprising, a neighbour selector circuit which selects the detectors nearest to the one having the peak output, an averager circuit which averages the outputs of the detectors selected by said neighbour selector circuit, and a subtractor circuit which subtracts the output of said averager circuit from that of the detector having the peak output.

2. The system according to claim 1, wherein said sensor further includes a body member having an outer face defining said spherical surface and formed with a plurality of radially-extending, radiation-conducting passageways leading to said solar-radiation detectors and shielding same against all solar radiation except that progressing along said radial lines.

3. The system according to claim 2, wherein said body member is of material which is substantially non-conducting with respect to solar radiation, said radiation-conducting passageways being bores extending radially through the body member from its outer face to the solar radiation detectors.

4. The system according to claim 3, wherein the body member further includes an optical fiber element in each bore for conducting the solar radiations intercepted thereby to their respective solar radiation detectors.

5. The system according to claim 2, wherein said body member is of semispherical configuration.

6. The system according to claim 5, wherein the underface of the semispherical body member is substantially flat, and said solar radiation detectors are disposed on said flat underface.

7. The system according to claim 5, further including a semispherical transparent cover overlying the outer face of the body member.

8. The system according to claim 5, wherein there are two of said semispherical body members in back-to-back relationship so as to define a sensor of spherical configuration.

9. The system according to claim 2, wherein said body member is of spherical configuration.

10. A system according to claim 1, wherein said means for producing a measurement of the direct solar radiation intensity further includes a second averager circuit which is effective, if more than one detector outputs a peak reading, to average the outputs thereof and to supply the averaged output to said subtractor circuit.

* * * * *